March 11, 1969  A. W. ELLSWORTH ET AL  3,431,871
READILY ASSEMBLED AND DISASSEMBLED TABLE
Filed Nov. 7, 1966  Sheet 1 of 6

INVENTORS.
ARTHUR W. ELLSWORTH
ROBERT K. FUJIOKA
TIM M. UYEDA

Van Valkenburgh & Loewe

ATTORNEYS

FIG. 34

United States Patent Office 3,431,871
Patented Mar. 11, 1969

3,431,871
READILY ASSEMBLED AND
DISASSEMBLED TABLE
Arthur W. Ellsworth, South San Gabriel, Robert K. Fujioka, Los Angeles, and Tim M. Uyeda, South San Gabriel, Calif., assignors to Samsonite Corporation, Denver, Colo., a corporation of Colorado
Continuation-in-part of application Ser. No. 494,595, Oct. 11, 1965. This application Nov. 7, 1966, Ser. No. 600,329
U.S. Cl. 108—153     18 Claims
Int. Cl. A47b 3/02

ABSTRACT OF THE DISCLOSURE

A table has a top which is provided with a peripheral, depending rim and radial struts fixed within such rim, with legs removably attached to the struts. A yoke pivotally connected to each leg holds the same in fixed position. The ends of the yokes are attached by removable clips to the inside of the rim or have hooks for engaging holes in the inner edge of the rim, the rim being hollow in the latter instance. The table may be stored in a minimum of space by removing the legs and yokes and storing the same in the quadrants between the struts.

---

This application is a continuation-in-part of our copending application, Ser. No. 494,595, filed Oct. 11, 1965 (now forfeited).

This invention relates to furniture of the table type, and more particularly to tables susceptible of ready disassembly for facility of transportation and storage and convenient reassembly.

Among the objects of this invention are to provide a novel, improved and practical table; to provide a novel and improved table which is especially suited for use outdoors; to provide a novel and improved table which, in one form, permits facile disassembly and reassembly without resort to tools; to provide a novel and improved table which, in another form, permits facile disassembly and reassembly without resort to special tools, as well as permitting adjustment of individual leg height; to provide a novel and improved table which is sturdy and reliably stable when assembled for use; to provide a novel and improved table having readily substituted, alternative tops; to provide, in a table, a novel and improved means for operatively interengaging separable components; to provide a novel and improved table which, in all forms, is amenable to production in a wide range of sizes; and to provide a novel and improved table which is economical in production, durable throughout a long life of repetitious use, conservative of space and labor, and positive and efficient in attainment of the ends for which designed.

This invention resides in a table whose top has a depending peripheral rim and radial struts on the underside of the top; whose legs are separably attached to the underside of the respective struts; and which includes means separably coupling each leg in braced relation to the rim. Such coupling means conveniently comprises a yoke for each leg which is centrally attached to the leg and has divergent arms, the outer ends of which are removably attached to the depending rim, as by angular tips engaging holes in the rim, or adjustably attached by clips to the inside of the rim. Each leg may also have a shoe at its upper end having tongues or prongs engaging slots in the corresponding struts.

With the foregoing and other objects in view, the invention resides in the construction, arrangement, and operative combination of features and elements as hereinafter set forth and illustrated in the accompanying drawings, in which.

Current trends in domestic and recreational practices have emphasized the utility and promoted the practical merit of weather-resistant tables qualified for facile assembly and disassembly, with consequent convenience in handling and storage. Thus, the present invention is directed to the provision of such a table which may be produced in a wide range of optional forms, sizes, materials and finishes, accompanied by simplicity and economy in production, ease of assembly for use and disassembly for storage without recourse to tools or special tools, as well as being light in weight, minimal in bulk and sturdy in assembled condition for use.

Figure 1:
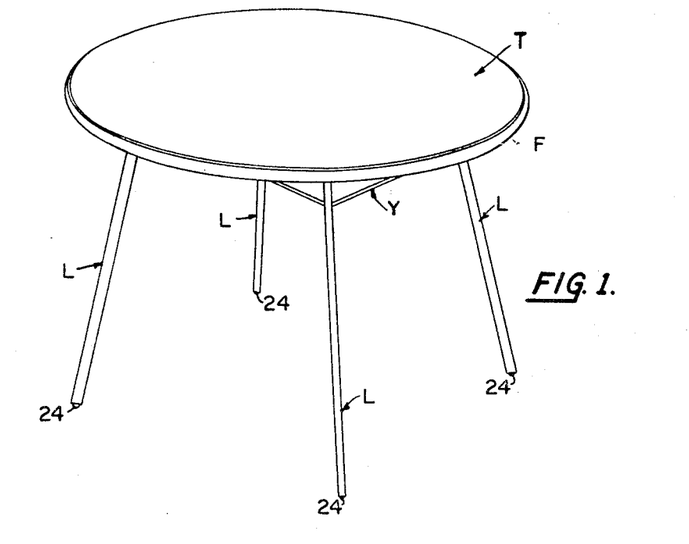
FIG. 1 is a perspective view of a table of this invention, assembled for use.
Figures 2, 3:
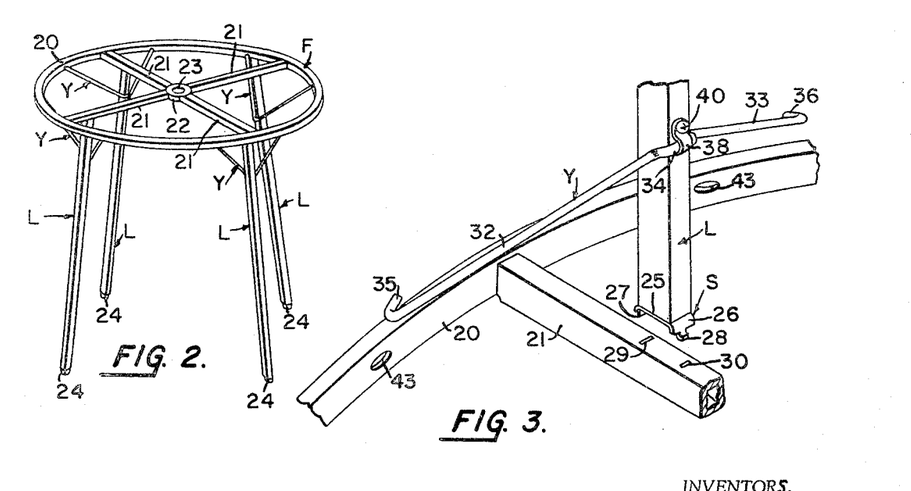
FIG. 2 is a perspective view, on a reduced scale, of the top supporting framework of the table of FIG. 1.
FIG. 3 is a fragmentary, perspective view on an enlarged scale and looking upwardly from beneath, of an interassociation of components at the upper end of one of the legs of the framework of FIG. 2, shown in separated relation prior to assembly.

In an organization manifestly amenable to accommodate variations in size, style, materials and finishes, the improvide table of the present invention includes, as in FIGS. 1 and 2, a top T, a rigid planar frame F, to which the top T is attached to form a top assembly, a series of independent legs L individually connectable with the frame F for supporting the top assembly in a substantially horizontal position, and a series of latch yokes Y, each operatively associated with a leg L for bracing and immobilization of the leg relative to the frame.

Largely determinative of the size and shape of the table, the frame F may be of preferred conformation and dimensions, in a rigid construction to accomplish the purposes of the invention, and includes a continuous peripheral rim 20 interiorly traversed by straight, rigid, coplanar struts 21, symmetrically arranged and angularly spaced to converge in a central nave 22. In a practical arrangement, the rim 20 may, as illustrated, be circular in fixed, embracing relation with four radially disposed struts 21 divergent from the central nave 22 which, for purposes hereinafter explained, is preferably provided with a vertical bore 23. The rim 20 and struts 21 may be formed, as shown, from suitably rigid, tubular material, such as rectangular in transverse section, and amenable to conventional fixed connection, as by welding, brazing or the like.

Figure 4:
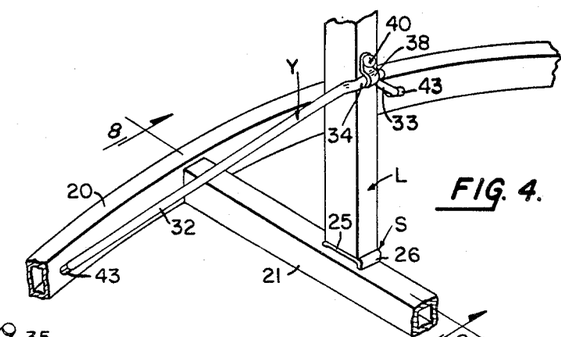
FIG. 4 is a fragmentary, perspective view, similar to FIG. 3, but showing the components when assembled.
Figures 5, 7:
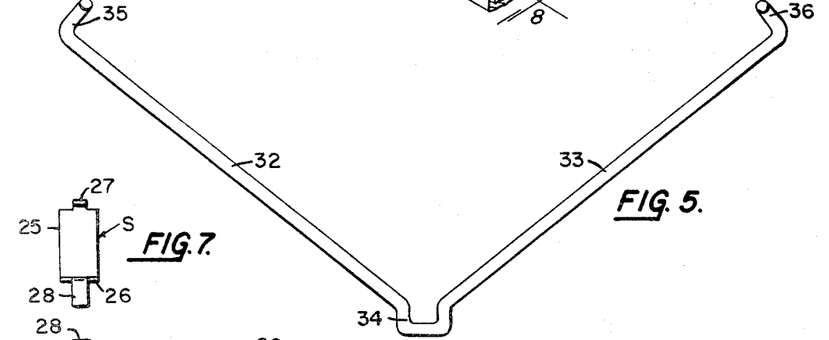
FIG. 5 is a bottom plan view of a latch yoke, one of the components of FIG. 4.
FIG. 7 is a top plan view of a shoe attached to the top of the leg of FIG. 6.
Figure 6:
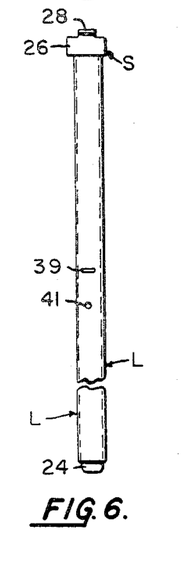
FIG. 6 is a condensed, side elevation, taken from the inside and on a reduced scale, of a leg whose upper end is shown in FIG. 4, but which is shown in an upright position in FIG. 6.
Figure 8:
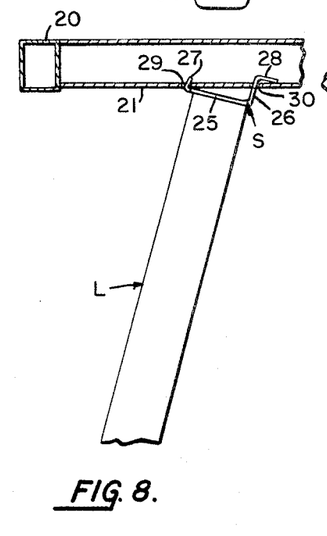
FIG. 8 is a fragmentary section, on an enlarged scale and taken along line 8—8 of FIG. 4, but with the parts in upright position.

The legs L are corresponding lengths of desirably tubular, rigid material, longitudinally straight or conformed to preference, either rectangular or circular in cross section and each having a glide 24 secured to the lower end and a shoe S at the upper end, the latter being fixed to the leg, as by brazing. To provide for detachable connection of the legs, in appropriate supporting relation with one of the frame struts 21, each shoe S may be unitarily formed from plate material to provide a flat web 25 registrable in fixed attachment to and perpendicularly across the upper end of the leg, as in FIGS. 6, 7 and 8, with an upwardly extending flange 26 at the inner end of the web, an angular tongue 27 of reduced relative width projecting from the web parallel to and away from the adjacent leg side and an angular tongue 28, also of reduced width, extending from flange 26 to dispose its free end as an outward offset, both laterally and longitudinally, from the leg. Web 25 and flange 26 conveniently approximate the under surface width of a strut 21, to extend at each end of the shoe beyond the reduced widths of the tongues 27 and 28, so that each will provide a shoulder forming a bearing area to engage, as in FIG. 8, the under surface of the corresponding strut. The shoe S serves to detachably connect the associated leg L to the strut 21 through coaction of the shoe S with transverse slots 29 and 30, as in FIGS. 3 and 8, formed in properly spaced relation in the under surface of the strut and inwardly from the rim and strut connection, to receive tongues 27 and 28, respectively. As exemplified in FIGS. 3, 4 and 8, the operations incident to connection and disconnection of a leg L with its shoe S, relative to a strut formed with the slots 29 and 30, are simple and easy. To connect a leg L to a strut 21, the free end of the tongue 28 is placed in the slot 30, and the leg is then rocked toward the rim 20 to full intrusion of the tongues 27 and 28 into the slots 29 and 30, as in FIG. 8. The shoulder formed by web 25 engages the under surface of the strut and preferably the tongue 28 is received within the slot 30 until the inner end of the tongue 28 engages the inside surface of the strut. In this position, by virtue of the flange 26, the leg has a slight outward divergence from the strut, relative to the frame rim 20, with freedom to rock inwardly but not outwardly, since any tendency of the leg to rock outwardly is effectively opposed by the latching coaction of the tongue 28 and the strut. Obviously, simple rocking of the attached leg inwardly of the frame suffices, in a reversal of the foregoing, to detach the leg from the strut.

Figure 9:
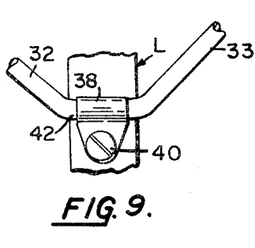
FIG. 9 is a fragmentary, detail elevation on an enlarged scale and in upright position, illustrating the connection between a modified latch yoke and the leg of FIG. 6.

Being unstable in its attachment to the frame strut against inward rocking, as just described, the leg L requires means, supplied in the form of the latch yoke Y, to brace and secure the leg in its operative relation with the frame F. Formed from a single length of stiffly resilient material, such as spring steel rod or wire, the yoke Y includes straight arms 32 and 33, obtusely but symmetrically divergent from a rectangular open vertex 34, conformed to partially embrace a leg L, and angularly related tips 35 and 36 at the outer ends of the respective arms. The tips 35 and 36 may be disposed at any suitable angle although tips extending perpendicular to the arms but in a plane at an angle of 28° to the plane of the arms have been found suitable. The latch yoke Y is hingedly attached at its vertex 34 to the leg, so that the arms will extend at opposite sides laterally from the leg in any expedient manner, a practical attachment being illustrated as a clip 38 adapted to confine the straight base of the vertex, with one end of the clip extending into a slot 39 in the leg, shown in FIG. 6, and the opposite end of the clip being clamped by means of a screw 40 received in a hole 41 in the leg, appropriately spaced from the slot 39. In the modified yoke illustrated in FIG. 9, a straight base 42 is provided for pivotal attachment to a leg L by a clip 38, the base being sufficiently wide that the inner ends of arms 32 and 33 will clear the sides of leg L.

The latch yoke Y is free to rock longitudinally of the leg and to oscillate with the leg for approach of its angularly disposed tips 35 annd 36 to the inner face of rim 20 when the leg L is attached to a strut 21 in a position of intended use, while the arms 32 and 33 are also manipulable manually. Thus, connection of the latch yoke Y to the frame rim 20, to secure the corresponding leg L in operative position for use, is produced by manual engagement of the yoke arm tips 35 and 36, either separately or simultaneously, with holes 43 in the inner face of rim 20 at opposite sides of the corresponding strut, as in FIG. 3. Holes 43 are laterally elongated, as shown, so that an arm 32 or 33 may be pulled away from the leg and the tip 35 or 36 more readily inserted in the hole. Thus, when assembling a leg L to the table, after the tongue 28 of leg shoe S has been inserted in hole 30 and the leg rocked forwardly, but before tongue 27 has completely entered hole 29, arms 32 and 33 may be spread outwardly and the tips 35 and 36 guided into holes 43, simultaneously with completion of the rocking movement of the leg. Or, the leg may be rocked forward and arms 32 and 33 simultaneously shifted, so that tips 35 and 36 will clear the underside of rim 20. Then, the leg may be held in that position and each arm, in turn, spread outwardly and then moved toward the corresponding hole 43, with tip 35 or 36 being simultaneously guided into the hole. As soon as the tip enters hole 43, the arm may be released, since the resilience of the yoke causes the tips to be pulled into the holes, as in FIG. 4.

For storage and shipping purposes, the legs L will fit individually in the spaces between struts 21, with yokes Y, attached to the legs, having one end adjacent rim 20 and the other end alongside or overlying the adjacent strut. As will be evident, for shipping purposes, a relatively thin carton adapted to receive the top assembly, which includes top T and frame F, will suffice, while for storage purposes, a narrow space will correspondingly suffice. If desired, a clip for receiving each leg may be attached to the underside of the top T, for holding the legs both for storage and shipping.

In the alternative leg and yoke construction of FIGS. 10–16, each leg L' may be generally circular in cross section, to resist twisting or torsional stress and also to resist bending equally in all directions, thereby providing greater stability when the top of the table may be twisted during movement from one place to another without being lifted bodily. As will be evident, the greater lateral dimension of legs L of FIGS. 1 and 2 is disposed radially of the table, which provides sufficient resistance to bending moments in that plane, but less resistance in a transverse plane. Thus, for sufficient resistance to loads on the table, the resistance to pushing or pulling of the table in a radial direction is sufficient. However, if the table is twisted during movement or use, the wall thickness of the legs may not have the desired resistance to the bending moments and either a greater wall thickness may be utilized or legs L' of FIGS. 10 and 15, having a circular cross section, may be utilized. Each leg L' is provided at its upper end with a shoe S', with the upper end 45 of the leg flared inwardly on two opposite sides and inwardly on the other two opposite sides to provide a rectangular configuration at the upper end to correspond to the rectangular shape of web 25 of shoe S'. The lower end 46 of the leg is tapered downwardly to fit inside a circular glide 47 formed of rubber or plastic. Shoe S' is provided with an upwardly extending flange 26, at its inner edge, similar to shoe S, with the outer edge of web 25 and the upper edge of flange 26 providing bearing shoulders to engage the underside of a strut 21, as before. A tongue 27", of reduced width and at the outer edge is adapted to fit in slot 29 in the underside of the corresponding strut, but is inclined outwardly from the center line of the leg, so as to be upright when the leg is installed, as in FIG. 15. A tongue 28', also of reduced width, may be inclined at 120° to flange 26, rather than 90°, so that upon full insertion in slot 30, the underside of the tongue adjacent flange 26 will bear against the edge of slot 30 inside the strut, rather than the end of the tongue bearing against the inside of the strut, to resist an outward rocking movement of the leg. However, the installation and removal of each leg L' is similar to that described previously.

Figures 10, 11, 12:
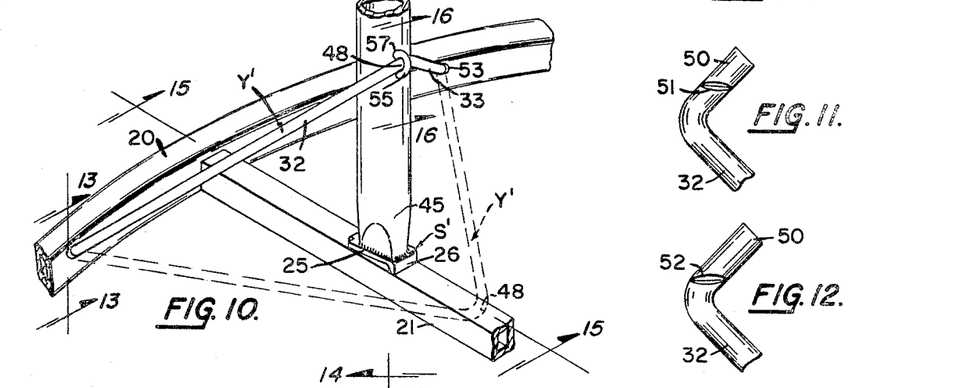
FIG. 10 is a fragmentary, perspective underneath view similar to FIG. 4, but showing an alternative construction of the components.
FIG. 11 is a fragmentary, top plan view, on a further enlarged scale, of one end of a yoke alternative to that shown in FIG. 5.
FIG. 12 is a bottom plan view of the yoke end of FIG. 11.
Figure 13:
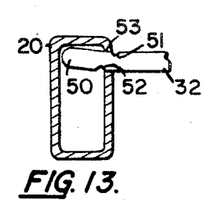
FIGS. 13 and 13a are similar cross sections, on an enlarged scale and taken along line 13—13 of FIG. 10, corresponding to the dotted and full positions, respectively, of a yoke of FIG. 10.
Figure 13A:
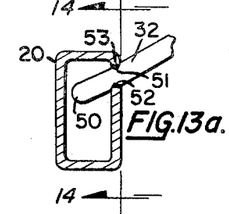
Figure 14:
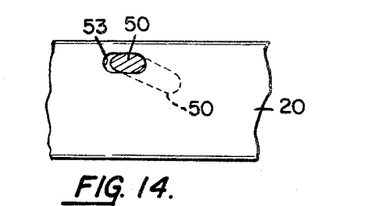
FIG. 14 is a fragmentary, vertical section, taken along line 14—14 of FIG. 13.
Figure 15:
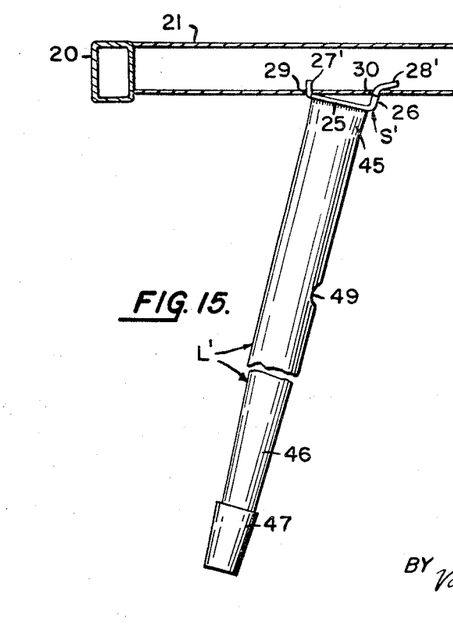
FIG. 15 is a condensed, vertical section taken along line 15—15 of FIG. 10, but showing the parts in an upright position, as in FIG. 8.
Figure 16:
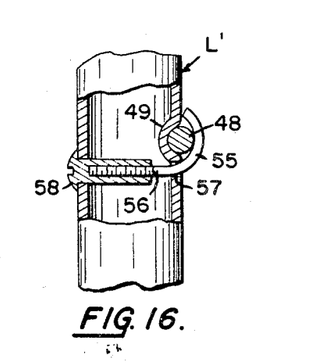
FIG. 16 is a fragmentary, vertical section taken along line 16—16 of FIG. 10, but showing the parts in an upright position.

Each yoke Y' may be attached to the corresponding leg and removably attachable to rim 20, as before, but may be attached to the rim and removably attachable to the leg L', as in the full position of FIG. 10. When detached from the leg, the yoke Y' is merely dropped onto the strut 21, as in the dotted position of FIG. 10, so that each leg may be more readily stored or shipped in the space between adjacent struts 21, on the underside of top T. Thus, each yoke Y' has a pair of arms 32 and 33 which diverge laterally from a rounded apex 48, adapted to fit into a dimple 49 formed in the leg, as in FIGS. 15 and 16. Arms 32 and 33 each terminate in a top 50 which may be inclined upwardly from the plane of arms 32 and 33 a few degrees only, being provided on the top with an angularly disposed notch 51, as in FIG. 11, and on the underside with an angularly disposed notch 52, as in FIG. 12, with the notch 52 on the underside being farther from the end of the tip, as shown. The bottoms of notches 51 ad 52 are preferably concave, as in FIG. 13, so that the notches will lock on the edges of an elongated slot 53 in rim 20 having a width corresponding to the diameter of the yoke rod, when tilted to the position of FIG. 13a, which corresponds to the full position of FIG. 10, from the position of FIG. 13, which corresponds to the dotted position of FIG. 10. As will be evident, in the position of FIG. 13a, the yoke will resist both inward and outward rocking of the corresponding leg. When attached to rim 20, yokes Y' need not be formed of spring material, but instead may be formed of cold rolled steel rod stock. Prior to initial installation, the yokes Y' are formed with arms 32 and 33 at a lesser divergence, so that each tip 50 may be sprung into the corresponding slot 53 and tips 50 will retain the yoke in its attachment to the rim, as when the yoke lies against strut 21, i.e. the dotted position of FIG. 10, but will permit the pivotal movement described above. When abutting strut 21, as in the dotted position of FIG. 10, the yoke Y' clears the slots 29 and 30 in the strut, so that leg L may be placed in the position of FIG. 15 and yoke Y' moved to the full position of FIG. 10, and apex 48 snapped into dimple 49. Yoke Y' may then be more securely attached to the leg, as by a clip similar to clip 38 of FIG. 9 or by a hook 55, as in FIG. 16, having a threaded leg 56 inserted in a hole 57 at the edge of dimple 49 and threadedly engaged by an interiorly threaded, thimble type nut 58, inserted through a hole opposite hole 57 in the leg. As will be evident, other suitable ways of removably attaching yokes Y' to legs L' will be evident to those skilled in the art.

Figure 17:
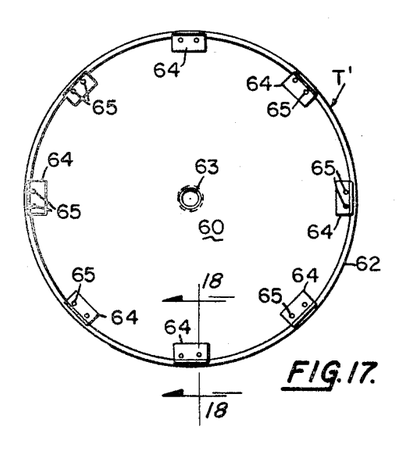
FIG. 17 is a bottom plan view of a table top suitable for use on the table of FIG. 1.
Figure 18:
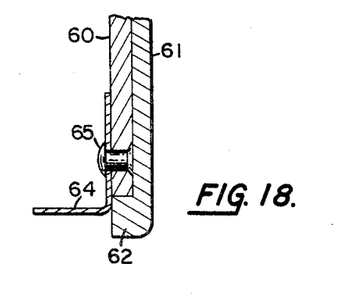
FIG. 18 is a fragmentary, detail section taken on an enlarged scale along line 18—18 of FIG. 17, at the outer edge of the top.

The upper surface of top T may be completely smooth, as in FIG. 1, or a central, reinforced hole may be provided, to register with bore 23 of nave 22 of frame F, shown in FIG. 2, so that a pole for supporting an umbrella or the like may be placed in the center hole. As in the case of top T' of FIGS. 17 and 18, the top may include a flat, circular support 60 formed of plywood or other structural material, overlaid by a finish layer 61 having a depending rim 62, which surrounds the edge of the support 60. Finish layer 61 may be formed of any desired material having an attractive appearance, but perhaps requiring structural support, such as a composition of marble dust and synthetic resin or the like. The finish layer 61 may be attached to support 60 by a suitable adhesive, while the upper surface of the top may be unbroken, as in FIG. 1, or both the finish layer 61 and support 60 may be provided with a central hole coinciding with bore 23 of nave 22 of FIG. 2, and in which a removable thimble 63 is inserted for covering the hole when no umbrella or the like is to be used. A series of circumferentially spaced angles 64 may be attached, as by rivets 65, to the underside of support 60, prior to the attachment of finish layer 61 thereto, while the depending legs of the angles may be attached, as by sheet metal screws or by welding, brazing or the like, to either the inside or outside of rim 20 of frame F. Thimble 63 may be removed, when desired, to provide an opening through the top, and the nave 22 is, hence, made available to receive and support poles, staffs, standards, and the like, appurtenant to facilities appropriate for supplementary association with the erected table.

Figure 19:
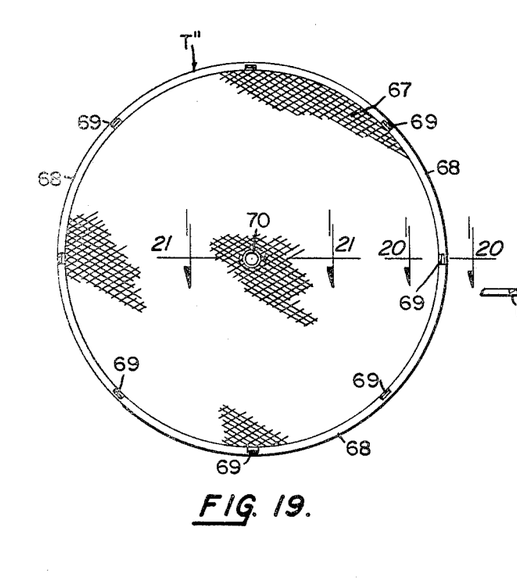
FIG. 19 is a bottom plan view of a table top, alternative to that shown in FIG. 17.
Figure 20:
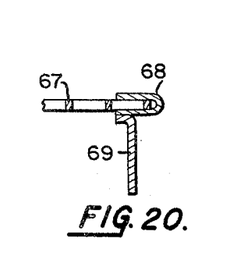
FIG. 20 is a fragmentary, detail section taken on an enlarged scale along line 20—20 of FIG. 19, at the outer edge of the top.
Figure 21:
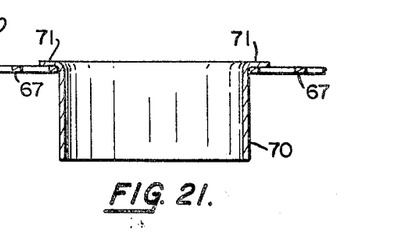
FIG. 21 is a fragmentary, detailed section taken on an enlarged scale along line 21—21 of FIG. 19, at the center of the top.
Figure 22:
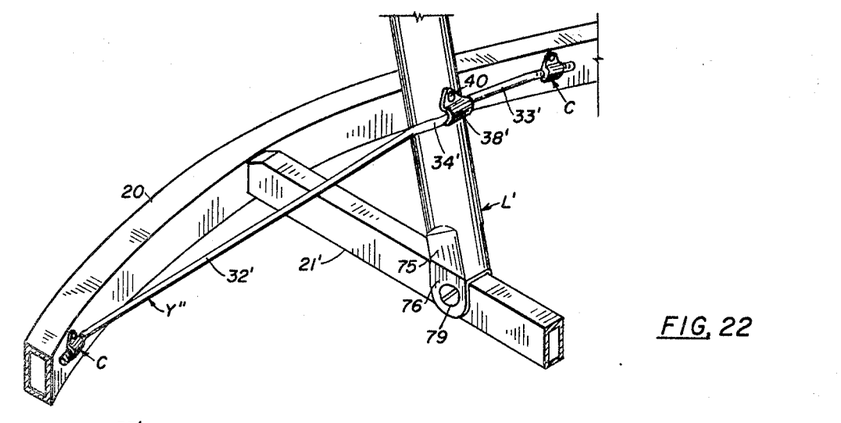
FIG. 22 is a fragmentary, perspective underneath view, similar to FIGS. 4 and 10, but showing a further alternative construction.

Functionally identical with and structurally analogous to the top arrangement just described, a top T" of FIGS. 19, 20 and 21 differs in the substitution of a flat, reticulate metal plate 67, as of expanded metal, with a U-shaped rim 68 clamped around the outer edge thereof and a circumferentially spaced series of angles 69 depending from the rim. Angles 69 are attached to the underside of the rim in any suitable manner, as by brazing, spot welding or the like, and the depending legs thereof are attached to either the inside or outside of the frame rim 20, as before. Plate 67 may be unbroken across the top or provided with a central hole in which a sleeve 70 is secured, as by spot welding an upper flange 71 of the sleeve to the plate 67. Sleeve 70 may, of course, be adapted to fit within bore 23 of nave 22 of FIG. 2, of the frame F.

In the event that the top is not provided with a central hole, as in FIG. 1, the central nave 22 of the frame F may be omitted, with two opposite struts 21 being combined as a single diametrical strut and the inner ends of the other struts merely being attached, as by welding, to the center of the diametrical strut. It will be understood, of course, that other materials, in addition to those referred to specifically, may be utilized for the various parts.

Figure 31:
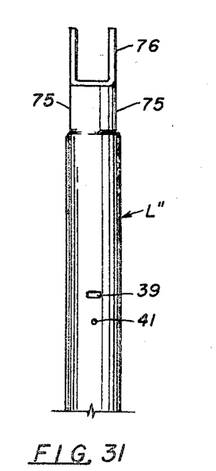
FIG. 31 is a side elevation, taken from the inside, of the upper portion of the leg of FIG. 30.
Figure 32:
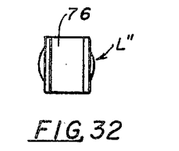
FIG. 32 is a top plan view of the leg of FIG. 31.
Figure 33:
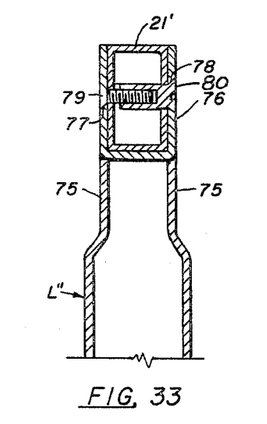
FIG. 33 is a fragmentary, generally vertical section, on an enlarged scale and taken along line 33—33 of FIG. 30.
Figure 34:
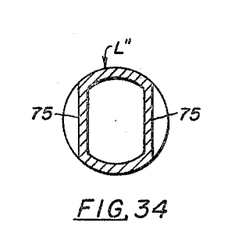
FIG. 34 is a transverse section, on an enlarged scale and taken adjacent the upper end of the leg along line 34—34 of FIG. 30.

In the alternative leg and yoke construction of FIGS. 22–34, a series of hollow, rectangular struts 21' extend outwardly from the center of the table frame to circular rim 20, also conveniently hollow, with the upper end of a leg L" detachably mounted on the underside of each strut 21' and secured in position by a resilient yoke Y''', which maintains the leg in outwardly and downwardly inclined position. Each yoke is connected to the corresponding leg and to the rim 20, on the opposite sides of the strut 21', to provide an arrangement as shown in FIGS. 1 and 2. Each leg L", as in FIGS. 30–34, may be circular in cross section, with opposed flats 75 formed at the upper end to conform to the base of a U-shaped saddle 76 and the upper end of the leg oblique and welded to the base of the saddle, so that the saddle may fit onto the strut 21' and the leg will extend at the desired angle. The opposite sides of the saddle 76 are provided with chamfered holes 77 and 78, respectively, as in FIG. 33, to accommodate a screw 79 and a thimble nut 80, which extend through corresponding holes in the sides of strut 21' and detachably attach the leg to the strut. Of course, the saddle and strut need not be made to machine tolerances, so that a slight play of the leg relative to the strut is normally present, which is taken advantage of in the adjustment of the leg, as described below. On the inside and spaced an appropriate distance from the upper end, as in FIG. 31, each leg is provided with a slot 39 and a hole 41 for attachment of a clip 38' having an ear which extends into the hole 39 and a screw 40, such as a self-tapping metal screw, which taps its own threads in hole 41, for attachment of the yoke Y'''.

Figures 23, 24, 25, 26, 27:
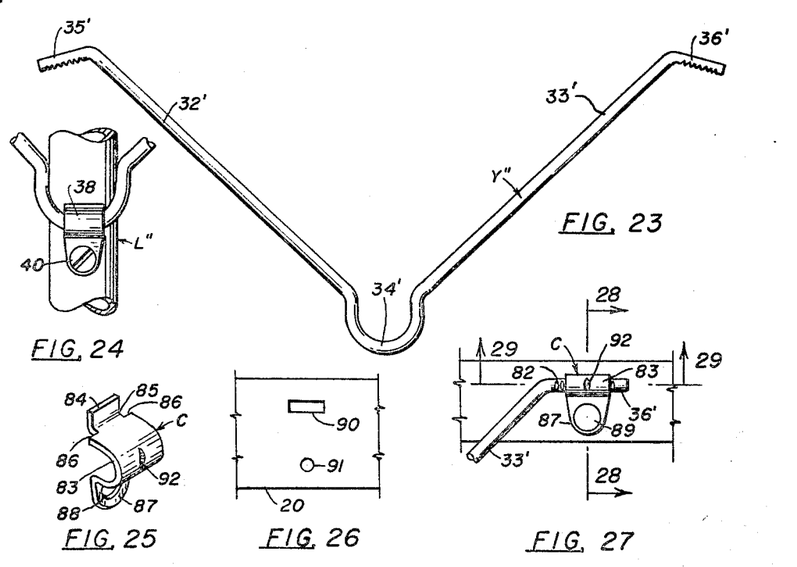
FIG. 23 is a bottom plan view of a yoke, one of the components of FIG. 22.
FIG. 24 is a fragmentary, detail elevation on an enlarged scale and in upright position, illustrating the connection between the yoke and leg of FIG. 22.
FIG. 25 is a perspective view of a clip for attaching one end or tip of the yoke to the depending rim of the table.
FIG. 26 is a fragmentary elevation, on an enlarged scale, taken from the inside and showing the portion of the rim to which the clip of FIG. 25 is attached.
FIG. 27 is a fragmentary inside elevation, on a lesser scale than FIG. 26, showing the clip attachment of the yoke tip to the rim by a clip.
Figure 28:
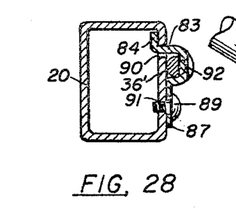
FIG. 28 is a vertical section, on an enlarged scale and taken along line 28—28 of FIG. 27.
Figure 29:
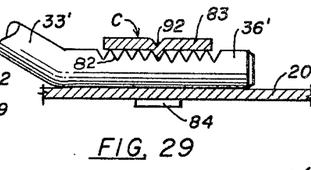
FIG. 29 is a fragmentary horizontal section, on a further enlarged scale and taken along line 29—29 of FIG. 27.
Figure 30:
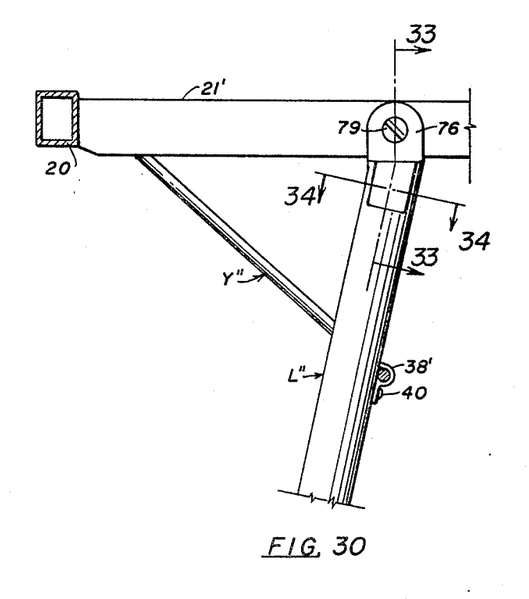
FIG. 30 is a fragmentary section, on a slightly enlarged scale and taken along line 30—30 of FIG. 22, but with the parts in upright position.

As in FIG. 23, yoke Y''' is provided with divergent arms 32' and 33', each of which extends laterally outwardly from an arcuate center 34', as at an angle of approximately 47° to the centerline of the yoke, and terminates in an angular tip 35' and 36', respectively. Center 34' conveniently has a radius corresponding to but greater than the radius of leg L", to provide for the angular position of the yoke center 34' extending around the leg, and is shown as in the same plane as arms 32' and 33', although it may be disposed at an angle to the plane of the arms, such as to partially encircle the leg in a plane perpendicular to the longitudinal axis of the leg. Tips 35' and 36' may extend downwardly, or out from the plane of the figure, as viewed in FIG. 23, at an angle of approximately 14° to the plane of arms 32' and 33', as well as outwardly at an angle of approximately 122½° to the centerline of the adjacent arm 32' or 33', i.e., at an angle of approximately 14½° to a line drawn between the outer ends of the legs. It will be understood, of course, that the angular relationship between the above parts of the yoke may be varied considerably. The yoke Y''', as the previous yokes, is formed of a resilient metal, such that each tip 35' and 36' may be inserted beneath a clip C attached to the inside of rim 20 and secured in that position through a series of serrations 82, preferably on the side opposite that which engages rim 20. Each clip C, as in FIG. 25, may comprise a semicylindrical body 83, from one side of which a tongue 84 of reduced width extends laterally, being connected to the body by a neck 85, also of reduced width to provide shoulders 86. From the opposite side of the body a flange 87 extends laterally and is provided with a hole 88 for receiving an attaching screw 89 of FIG. 28. As in FIG. 26, rim 20 is provided on the inside, at the position of each clip C, with a slot 90 and a spaced hole 91, for tongue 84 and screw 89, respectively. When clip C is inserted in a slot 90, tongue 84 will lie inside the hollow rim 20, as in FIG. 28, and the adjacent shoulders 86 will abut against the outside of rim 20, while the clip is clamped in position by screw 89, which is conveniently a self-tapping metal screw.

In further accordance with this invention the body 83 of clip C is provided with a centrally disposed dimple 92, which extends inwardly to engage one of serrations 82 in the tip 35' or 36' of the yoke, so that when screw 89 is tightened, the corresponding end of the yoke will be held against lateral movement. As will be evident, the yoke may be flexed in order to insert a tip 35' or 36' beneath a clip C and will move outwardly in the clip to a position corresponding to the angular position of the corresponding leg L". However, if one of the legs should be found to produce an uneven support for the table, it may be lengthened by loosening the corresponding screws 89 sufficiently to pull the tips 35' and 36' inwardly in the respective clip, and then retightening the screws to increase the effective length of that leg. Or the tips 35' and 36' of the corresponding yoke may be similarly adjusted outwardly in the corresponding clips C, in order to decrease the effective length of the leg L". Although such adjustment is normally available for a fraction of an inch, such as one-fourth inch in either direction, with the serrations 82 occupying one-half inch of length of the tip, such adjustment will normally be sufficient to overcome any disparity in the effective leg length, due to differences in effective length of various legs.

For easier initial assembly, the table is conveniently shipped, as in a carton, with the top attached to the supporting framework and clips C attached to the rim 20, and the legs disconnected from the struts, but the yokes Y''' attached to the legs. For assembly, which will be described first, it is necessary only to place saddle 76 of each leg over the corresponding strut 21', insert the screw 79 and thimble nut 80 through the appropriate holes, then tighten the same with a screwdriver. Then the tips 35' and 36' of each yoke may be slipped beneath the corresponding clip C, which has previously been loosened, and moved to a position in which dimple 92 will engage the center serration 82, as in FIG. 29. In this way, the legs will be more likely to have the same effective length, when the clips are tightened, but if any disparity exists, the effective length of the offending leg or legs may be adjusted in the manner described above. The holes in the sides of saddle 76 may be placed to produce a spacing of the saddle base from strut 21', to insure sufficient play to permit adjustment of leg length.

In order to disassemble the table, for storage purposes, the yokes may remain with the legs, in which event it is desirable to loosen the clips C, remove the yoke tips, then remove the screw 79 and thimble nut 80, or a machine screw and nut, if used, in order to remove the leg from the strut, then replace the screw and nut in the saddle 76, so that they will not become lost. The yoke may be pivoted downwardly toward the lower end of the leg, and each leg stored in the quadrant formed by the struts and the depending rim 20, or may be stored separately. Or, the screw 40 and clip 38' may be removed, to permit the yoke to be removed from the leg, and the clip 38' replaced on the leg, so that it will not become lost, then the yoke stored in a quadrant of the table top or separately. For reassembly purposes, the reverse of the above operation is utilized. It will be noted that, for either disassembly or reassembly, only a screwdriver, which is a common household tool, is required. Thus, no special tools are necessary.

If desired, the yoke tips 35' and 36' may be swaged flat and an elongated slot punched therein, so that only screws 89, extending through the respective slots, are necessary for adjustably attaching the yoke tips to the inside of rim 20.

Although preferred embodiment and variations in numerous parts thereof have been illustrated and described, it will be understood that other embodiments may exist and other changes and variations made, all without departing from the spirit and scope of this invention.

What is claimed is:

1. A table comprising:
   a top assembly having a peripheral, depending rim and radial struts fixed within said depending peripheral rim;
   a plurality of legs each individually separably attached at the upper end to the under side of one of said struts for supporting said top assembly in substantially horizontal position; and
   means separably coupling each said leg in braced relation to said rim.

2. A table as defined in claim 1, wherein said means separably coupling each said leg in braced relation to said rim includes a yoke centrally attached to the corresponding leg and having divergent arms provided with angular tips detachably connected to said rim.

3. A table as defined in claim 2, wherein each said yoke tip is connected to said rim by a clip detachably connected to said rim, said tip being adjustable in said clip and said clip and tip having means for holding said tip in adjusted position.

4. A table as defined in claim 3, wherein said clip comprises:
   a generally semicylindrical body having a centrally located, inwardly extending dimple, said tip having a series of serrations positioned to engage said dimple;
   a laterally extending tongue on one side of said body, said rim being hollow and having a slot for receiving said tongue; and
   a laterally extending flange on the opposite side of said body, said flange having a hole and said rim having a corresponding hole for a fastening device detachably connecting said clip to said rim.

5. A table as defined in claim 1, wherein:
   each said leg is provided at its upper end with a saddle having sides for engaging said strut on opposite sides thereof; and
   means for detachably connecting said saddle sides to said strut.

6. A table as defined in claim 1, wherein said top assembly includes:
   a flat structural support engaging the top surfaces of said struts; and
   an upper finish layer having a depending rim surrounding said flat structural support and engaging the top surface of said first mentioned rim.

7. A table as defined in claim 1, wherein said assembly includes:
   an apertured metal plate engaging at least the top surfaces of said struts; and
   a depending member attached to the periphery of said plate for attaching said top to said rim.

8. A table as defined in claim 1, wherein:
   said struts converge to the center of said top assembly; and
   said assembly includes a central member to which the inner ends of said struts are affixed, said central member being provided with a bore for receiving a sleeve when optionally depending from said top assembly.

9. A table comprising:
   a top assembly having a peripheral, depending rim;
   a plurality of legs each individually separably attached at the upper end to the underside of said top assembly for supporting said top assembly in substantially horizontal position;
   means separably coupling each said leg in braced relation to said rim;
   said legs each having a terminal shoe at the upper end having upwardly extending tongues; and
   the underside of said top assembly being provided with hollow members having slots for receiving said tongues.

10. A table as defined in claim 9, wherein:
    each said shoe is provided with an outer, upwardly extending tongue and an inner, upwardly and laterally inwardly extending tongue.

11. A table as defined in claim 9, wherein said tongues are narrower than the adjacent portions of said shoe, said adjacent portions thereby providing shoulders for engaging the under surface of said hollow member.

12. A table as defined in claim 9, wherein said shoe is provided with an upwardly extending flange below said inner tongue, whereby said leg is tipped outwardly at the lower end when said tongues are received in said slots.

13. A table comprising:
    a top assembly having a peripheral, depending, hollow rim;
    a plurality of legs each individually separably attached at the upper end of the underside of said top assembly for supporting said top assembly in substantially horizontal position; and
    resilient latch yokes for separably coupling each said leg in braced relation to said rim, each said latch yoke having a base hinged to the corresponding leg, a pair of arms extending laterally and upwardly on each side of said leg and an angularly disposed tip at the outer end of each arm, said rim being provided with means for receiving said tips.

14. A table as defined in claim 13, wherein:
    said rim is provided with spaced holes for receiving said tips, said base of said yoke being hinged on the inner side of the corresponding leg and formed so as to partially encircle said leg.

15. A table as defined in claim 13, wherein:
    said yoke tips are received in clips detachably connected to said rim, said yoke tips having a series of serrations opposite said rim and each clip having an inwardly extending projection for engaging one of said serrations;
    said legs are tubular and the upper ends thereof are oblique to the leg axis and said legs have flat opposed sides adjacent said upper end;
    a U-shaped saddle is attached to the upper end of each leg, said saddle having a base attached to said leg and sides forming a continuation of said flat sides of said leg and provided with opposed holes for receiving a removable fastening device; and
    said top assembly includes radial struts having sides engaged by said sides of said saddles.

16. A table comprising:
    a top assembly having a peripheral, depending, hollow rim;
    a plurality of legs each individually separably attached at the supper end to the underside of said top assembly for supporting said top assembly in substantially horizontal position; and
    means separably coupling each said leg in braced relation to said rim, said coupling means including a latch yoke having a base engageable with the corresponding leg, a pair of arms extending laterally and upwardly on each side of said leg and an angularly disposed tip at the outer end of each arm, said hollow rim being provided with spaced holes for receiving said tips.

17. A table as defined in claim 16, wherein:
said top assembly includes a rigid planar frame including said rim, a series of hollow struts extending across said frame and having ends affixed to said rim and a top mounted on said frame; and
said legs having upwardly extending members at the upper end and said hollow struts having holes for receiving said members.

18. A table as defined in claim 16, wherein:
said tips are provided with angularly disposed notches in the upper and lower surfaces thereof; and
said holes in said rim each includes a slot having edges engaged by said notches.

References Cited

UNITED STATES PATENTS

| | | | |
|---|---|---|---|
| 2,068,903 | 1/1937 | Boenning | 108—160 |
| 2,599,404 | 6/1952 | McLemore | 108—153 |
| 2,740,679 | 4/1956 | Vizzini | 108—156 |
| 2,768,044 | 10/1956 | Jaffe | 108—156 |
| 2,970,024 | 1/1961 | Urban | 108—160 |
| 3,031,244 | 4/1962 | Stopek | 108—153 |
| 3,032,380 | 5/1962 | Danciart et al. | 108—154 |
| 3,078,095 | 2/1963 | Wolf | 108—153 X |
| 3,220,365 | 11/1965 | Larson | 108—156 |

JAMES T. McCALL, *Primary Examiner.*

U.S. Cl. X.R.

108—160; 248—188.91